June 24, 1958 — J. C. FROMMER — 2,840,722
DETECTION DEVICE FOR MOVING PIECES
Filed Oct. 10, 1955 — 4 Sheets-Sheet 1
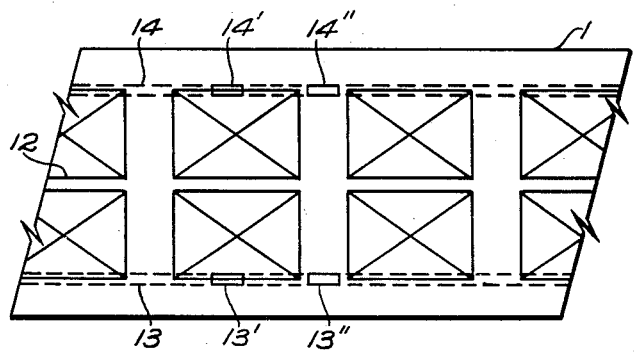
Fig. 3
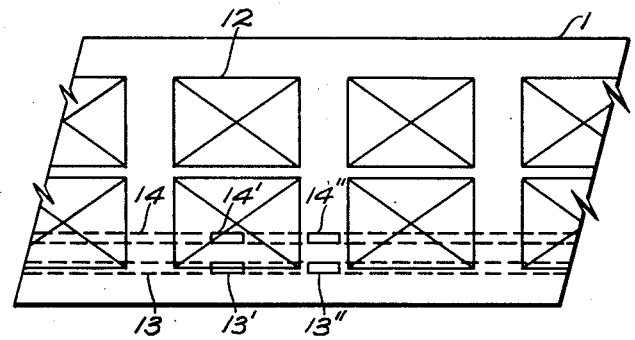
Fig. 2
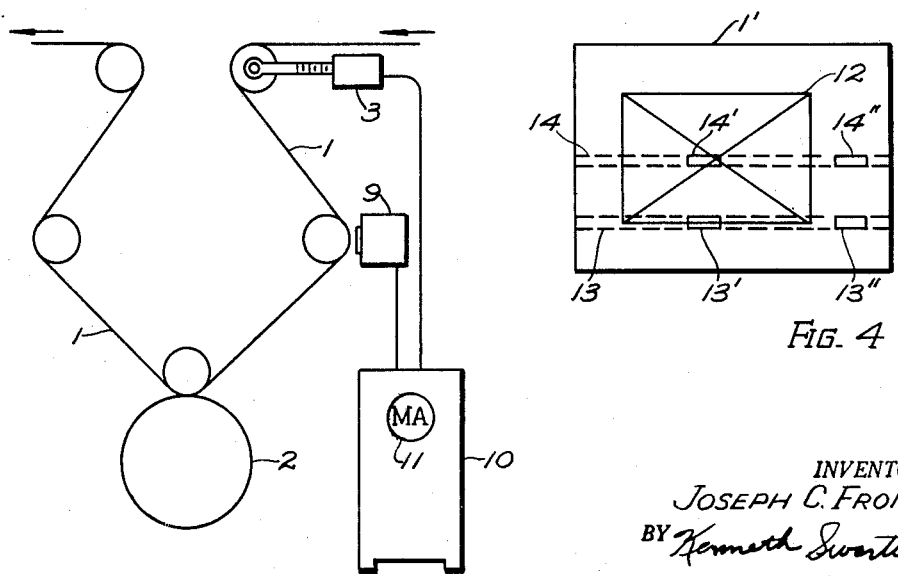
Fig. 4
Fig. 1
INVENTOR.
JOSEPH C. FROMMER
BY Kenneth Swartwood
ATTORNEY

INVENTOR.
JOSEPH C. FROMMER
BY
ATTORNEY

June 24, 1958   J. C. FROMMER   2,840,722
DETECTION DEVICE FOR MOVING PIECES
Filed Oct. 10, 1955   4 Sheets-Sheet 3

INVENTOR.
JOSEPH C. FROMMER
BY Kenneth Swartwood
ATTORNEY

United States Patent Office 2,840,722
Patented June 24, 1958

2,840,722

DETECTION DEVICE FOR MOVING PIECES

Joseph C. Frommer, Cincinnati, Ohio, assignor, by mesne assignments, to Electric Eye Equipment Company, Danville, Ill., a corporation of Illinois Application October 10, 1955, Serial No. 539,359

7 Claims. (Cl. 250—219)

This invention is a continuation in part of patent application No. 433,230, filed May 28, 1954, which generally relates to the detection of the lateral position of webs moving in machines performing on them certain operations. The present application refers, broadly speaking, to the following improvements over the said application:

In the original application the detection was dependent on the amount of alternating photoelectric signal obtained from the edge of printing and correction in one direction or the other depended on whether this signal was above a given upper level or below a given lower level. Indication of exactly correct lateral position or register occurred at a certain level of this signal. The same machine may be required to handle webs printed with widely varying patterns. Whenever the pattern is changed, the photoelectric signal may undergo such changes that readjustment of the system becomes unavoidable. To improve on this method, the present invention provides a second scanner which scans the printing in a parallel track and the system responds to what is broadly called the difference between the photoelectric signal obtained in the first track and that obtained in the second track. This second track is chosen either in the body of the printing, where small lateral displacements of the web cause little or no change in the amount of photoelectric signal, or it is chosen on the opposite edge of the printing where small lateral displacements of the web cause variations of the photoelectric signal opposite to those obtained in the first track. In this way, whenever the pattern is changed, the amount of signal to be expected for, say, perfect register changes to the same extent in both tracks and the difference between these two signals will remain a usable indication of proper side register.

If this second track is chosen in the body of the printing, then it may serve also for the same monitoring purpose as was described in the above mentioned earlier patent application, i. e., to discriminate the periods in which the photoelectric system viewing the edge of the printing is supposed to see the printed portion off which we want to keep register from periods in which this photoelectric system would see unprinted portions or such printing as would interfere with the wanted signal. A novel feature of the present invention in this respect will be dealt with in connection with what shall be referred to as "checkerboard patterns."

It is an object of the present invention to provide an improved device for detecting the lateral position of webs moving in machines performing on them certain operations, and also the lateral position of individual sheets fed into a machine.

A further object of the invention is to detect the lateral position of such printing as may be present on these webs or sheets.

A further object of the invention is to provide automatic compensation for differences between various patterns printed on sheets or webs fed into the same machine at various times.

A further object of the invention is to automatically suppress the effect of such parts of the printing which would interfere with the detection of the lateral position from the suitable portions of the printing.

A further object of the invention is to detect the lateral position of the edge of webs or sheets rather than the lateral position of printing wherever this is preferred.

Other objects and advantages of the invention may become apparent in connection with description of the drawings of which:

Fig. 1 is a schematic view of a portion of a printing press with blocks indicating the parts pertaining to the present invention.

Figs. 2, 3, 4, 5, and 6 show schematically a portion of printed web and individual sheets with the inspected track marked in.

Figure 9:
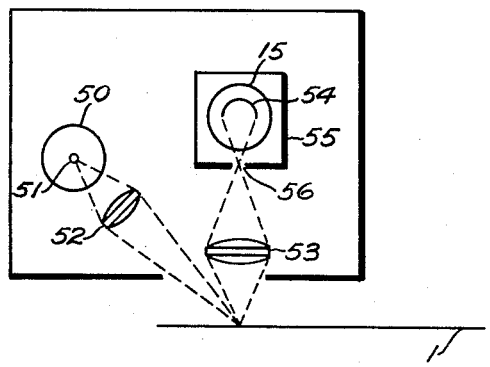
Fig. 9 shows schematically a photoelectric scanner used as known in the art.
Figure 10:
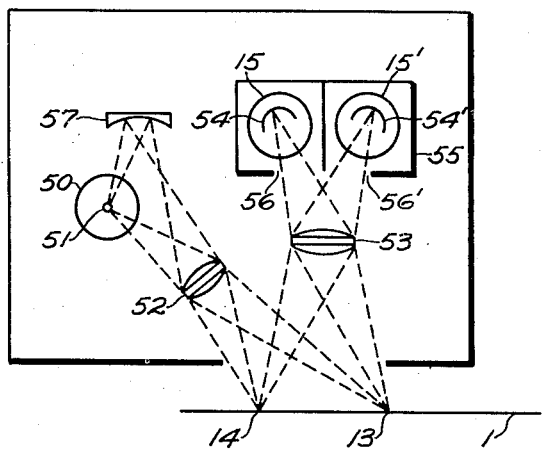
Fig. 10 shows a photoelectric scanner adapted specially for certain embodiments of the present invention.

Referring to Figure 1, 1 denotes the web, 2 a printing cylinder printing some patterns on said web, 3 symbolizes a correcting mechanism for adjusting the lateral position of the web by shifting the angular position of one or more pivoted guiding cylinders as known in the art. 9 is a twin photoelectric scanner, the details of which are shown schematically in Fig. 10. Two individual scanners, as shown in Fig. 9, could also be used. 10 represents a main amplifier with a meter 11 for the indication of the register condition.

In Figure 2, 1 is the printed web as in Figure 1 and 12 represents printing on it. A first scanner (or first phototube of a twin scanner) inspects track 13 of the web. 13' shows a portion of this track seen during the presence of printing and 13" shows a portion seen during the absence of printing. The phototube sees a relatively long dimension in the direction of the web travel, say ½ inch, and a relatively short dimension in the lateral direction, say .030 inch. The drawing shows the web in perfect lateral register. It is seen that if the web should be off register by more than .015 inch to one side, the phototube would see a completely printed portion, and if the web would be by .015 inch off to the other side, the phototube would see completely unprinted paper during passage of printing 12 under it. For a certain period the phototube sees an entirely unprinted portion 13" of paper in whichever direction the web is out of register. 14 denotes a second track in which a second scanner (or second tube of a twin scanner) inspects the relationship between the reflection from portion 14' and the reflection from portion 14". It is seen that in this track 14 the signal will be independent from small lateral movements of the web.

Fig. 3 is similar to Fig. 2 with the only difference that track 14 is chosen on the edge of the printing opposite to the edge on which track 13 is chosen. The signal in this track will be influenced by small lateral displacements of the web, but in a direction opposite to the direction in which the signal of the track 13 will be influenced.

Figure 5:
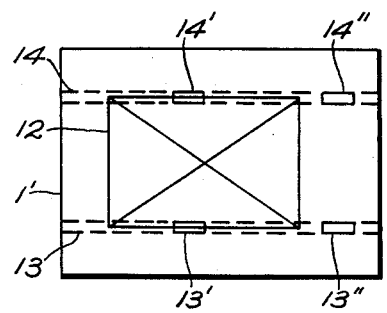

In Figs. 4 and 5, 1' represents a printed sheet to be fed into a machine as opposed to a continuous web 1 shown in Figs. 2 and 3. All other reference numbers refer to identical tracks and portions thereof.

Figure 6:
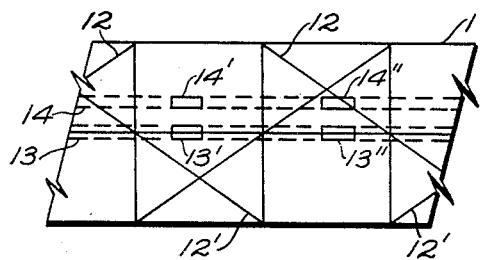

Fig. 6 represents a web similar to that shown on Fig. 2 but with the printing arranged in a "checkerboard pattern," i. e., one edge of printed portions 12 coincides with the opposite edge of printed patterns 12'. There the track 13 is chosen on this common edge, and track 14 is chosen in the body of printing 12.

Figure 7:
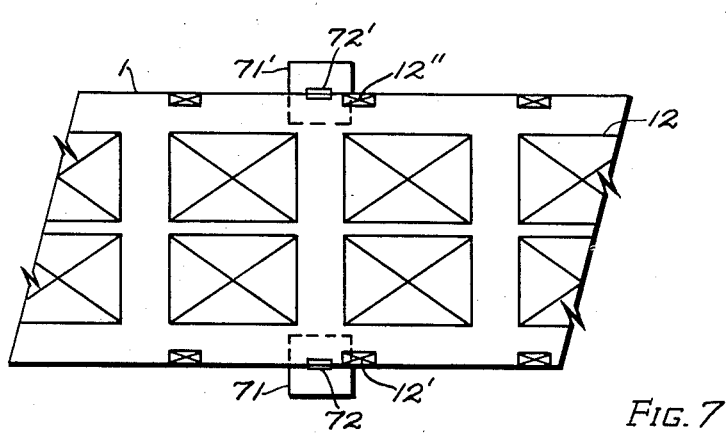
Fig. 7 shows a web and a backing surface in an embodiment of the invention in which the printed edge of this web or of sheets is used as the inspection track.

Fig. 7 represents a white web having on it a printed pattern 12, a second printed pattern 12' extending to one edge of the web and a third printed pattern 12" extending to the opposite edge. 71 and 71' are white plates, say 2 inches square, fastened to the machine behind the web, facing the scanners. 72 is the inspected portion and 72' is the portion inspected as a reference. When unprinted portions of the edge of the web pass under the photoelectric system, they see a white surface independently from the lateral position of the web. If the printed portions 12', 12" pass in front of the photoelectric systems, they see the more printed surface the farther out the edge of the web runs in their direction, and in this way the two photoelectric systems generate electrical signals depending in opposite directions on the lateral position of the web.

Figure 8:
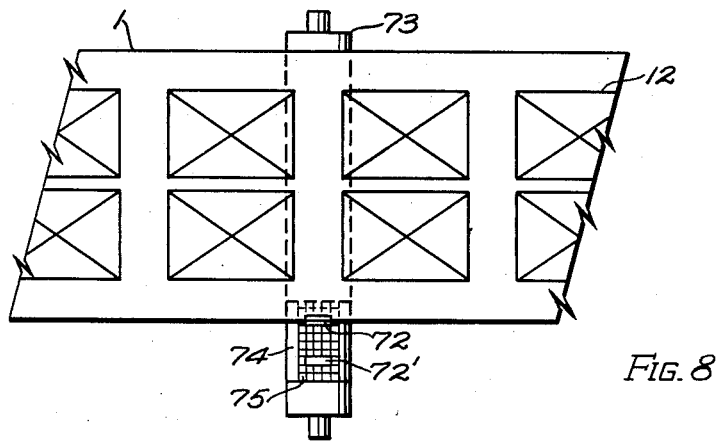
Fig. 8 shows a web and a backing roller in an embodiment in which the unprinted, or uninterruptedly printed edge of the web is used as the inspection track.

In Figure 8, 1 represents a web having on it printed pattern 12 not extending to the edge of the web. 73 is a roller having on it a portion 74 painted to a color similar to that of the unprinted web and a portion 75 contrasting in color to said unprinted web. 72 is the inspected portion and 72' is the reference portion. As the web moves through the machine, it pulls the roller along and bring alternatingly portions 74 and 75 in front of the photoelectric systems, so that for part of the time the photoelectric signal in both systems is independent from the lateral position of the web, but during another part of the time the photoelectric system viewing portion 72 gets a signal dependent on the lateral position of the edge of the web, while the system viewing portion 72' gets a monitoring or reference signal independent from this lateral position.

Figure 9 shows schematically the essential parts of a photoelectric scanner as known in the art. 50 represents a lamp having a filament 51. The light of filament 51 is concentrated by a lens 52 on the web 1. The phototube 15 having a light sensitive surface 54 is enclosed in a shield 55 having in it a narrow rectangular hole 56, to be called mask. A second lens 53 forms an image of the illuminated portion of web 1 in the plane of mask 56, so that the phototube 15 see a portion of said web similar to the shape of mask 56.

When a photosensitive transistor of the shape and size of mask 56 is used, it dispenses with the necessity of a separate mask.

Two such scanners are used in the present invention. Fig. 10 represents a scanner in which two scanner systems are united for the present invention. This scanner comprises, in addition to the phototube 15, a second phototube 15' having a cathode 54' and surrounded by a second compartment of the shield 55. These two phototubes inspect tracks 13 and 14 of web 1. Lens 52 throws an image of filament 51 on the track 13 of web 1. Behind the lamp 50 there is provided a spherical mirror 57 which throws a second image of filament 51 on track 14. The openings 56, 56' on the shield 55 may be so small as to delimit the respective inspected areas 13', 13", or 14', 14", shown in drawing 2, 4, 6 and the inspected areas 72, 72' shown in drawing 7, but they may also be kept so big that the entire images of the filament are inspected, so that these areas 13', 13", 14', 14", 72, 72' are delimited by these images of the filament rather than by the openings 56, 56'.

Figure 11:
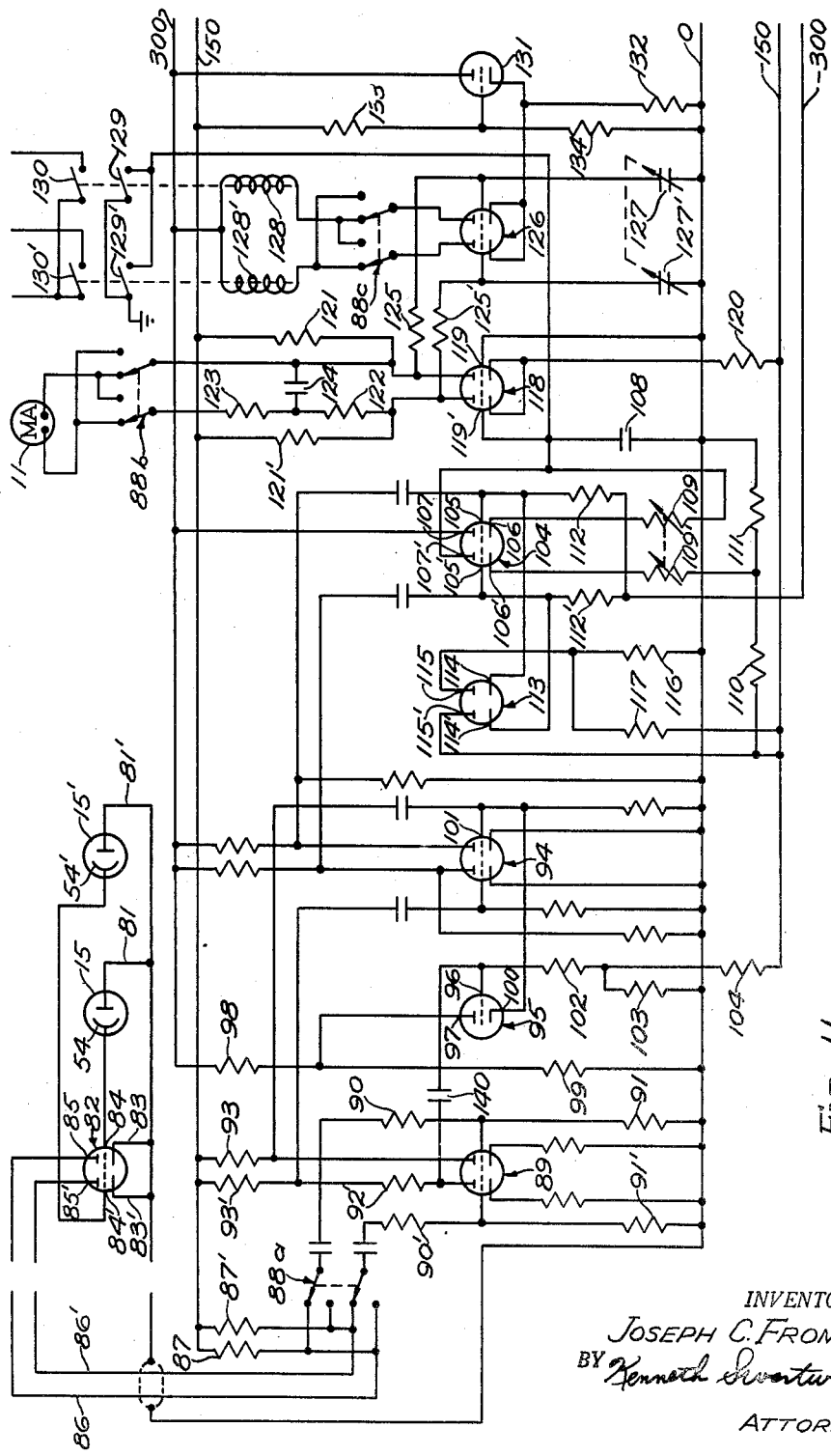
Fig. 11 shows the circuit diagram of an amplifier according to the invention.

Figure 11 represents the circuit diagram of a preferred embodiment of the invention for use with webs or sheets as shown in Figs. 2, 4, 6, 8. On this drawing 15, 15' represent phototubes having cathodes 54, 54' and anodes 81, 81'. 82 is a twin triode, e. g. of the 12AT7 type having cathodes 83, 83', grids 84, 84' and anodes 85, 85'. These parts are conveniently located in the scanner 9 of Fig. 1. Shielded leads 86, 86' connect anodes 85, 85' with plate load resistors 87, 87'. These parts as all other parts to be described henceforth may be conveniently located in the amplifier 10 of Fig. 1.

Leads 86, 86' are connected also through switch 88a to the input side of twin triode 89 which may be of the 12AX7 type. The input to this tube is reduced by voltage dividers 90, 91, and 90', 91'. The output of tube 89 is capacitance coupled to twin triode 94. The left side of 94 is fed from the tap of voltage divider 92', 93', its right side is fed from the entire output across load resistor 93. The entire output at the top of voltage divider 92', 93' is fed into grid 96 of triode 95 which may be of the 6C4 type. Plate 97 of triode 95 is connected to the tap of voltage divider 98, 99. Cathode 100 of tube 95 is connected to grid 101 of tube 94. Bias to grid 96 is provided through resistor 102 from voltage divider 103, 104.

The output of tube 94 is capacitance coupled to twin triode 104 which may be of the 12AT7 type. Plate 107 of twin triode 104 is connected to line 300 which is held at a positive voltage of, say, 300 volts with respect to the reference line or ground line 0 by a conventional supply, not shown. Plate 107' is connected to one, the "active," terminal of capacitor 108 of say, 1 microfarad. The other, "inactive" terminal of capacitor 108 is connected to line 0. The active terminal of capacitor 108 is also connected through variable resistor 109 to cathode 106 of tube 104. Cathode 106' of tube 104 is connected through variable resistor 109' to the tap of voltage divider 110, 111. 109 and 109' may be adjustable simultaneously to be 47K, 100K, 220K, 470K, 1 megohm and 2.2 megohms each (the abbreviation K standing for kilo-ohms or 1000 ohms). Grids 105, 105' of tube 104 are connected through resistors 112, 112' of, say, 10 and 4.7 megohms to line —300 held at a negative voltage of, say, —300 volts with respect to line 0 by a second conventional supply, not shown. Grids 105, 105' are also connected to cathodes 114, 114' of twin diode 113, so that grid 105' can not become more negative than diode anode 115' which is connected to line —150 (held at say, —150 volts with respect to line 0 by a voltage regulating tube, not shown) and grid 105 can not get more negative than diode anode 115 which is connected to the tap of voltage divider 116, 117 providing a voltage of, say —35 volts with respect to line 0.

The active terminal of capacitor 108 is also connected to grid 119' of twin triode 118 which may be of the 12AU7 type. The other grid, 119 of this tube is connected to line 0. Both cathodes of tube 118 are connected through resistor 120 to line —150, and its plates through load resistors 121, 121' to line 150, which is held at a voltage of, say, 150 volts, positive with respect to line 0 by a voltage regulating tube, not shown. These plates are also connected through resistors 122, 123 and switch 88b to meter 11. Capacitor 124 forms a filter with resistors 122, 123. The plates of tube 118 are also connected through resistors 125, 125' to the grids of tube 126 which may be of the 12AU7 type. These grids are also connected through adjustable capacitances 127, 127' to line 0. 125, 125' may be 1 megohm. 127, 127' may be simultaneously adjustable to be .02, .04, .10, .2, .5, and 1.0 microfarad each, providing time constants of from .02 to 1.0 second. The plates of tube 126 are connected through switch 88c and relay coils 128, 128' to line 300. Current through coil 128, or 128' causes contact 129 or 129' to connect the active side of capacitor 108 to line 0 and contact 130 or 130' to initiate correction of the lateral position of the web in one direction or in the other. The cathode of tube 126 is connected to cathode of tube 131 and via resistor 132 of, say, 10K to line 0. The grid of tube 131 (which may be of type 6C4) is connected to voltage divider 133, 134 at a voltage of, say 125 volts positive with respect to line 0.

Switches 88a, 88b, and 88c are mechanically interconnected. They allow to interchange the roll of phototubes 15, 15' and simultaneously to invert direction of indication of meter 11 and to interchange relay coils 128 and 128'. In the shown position phototube 15 is supposed to see the edge track 13 and phototube 15' the reference track 14 of Figs. 2, 4, 6 and 8.

The functioning of this circuit is the following: Referring to Figs. 1 and 2, 4, 6 or 8, as web 1 passes in front of the scanner 9, phototube 15 viewing the edge of the printing will generate an alternating voltage signal increasing or decreasing in amplitude according to the lateral position of the web. Phototube 15' viewing the body of printing will generate an alternating voltage signal independent from the lateral position of the web and having an amplitude equal to the maximum amplitude of phototube 15, corresponding to extreme out of register in one direction. These signals are amplified in tubes 82, 89, and the gain divided in such a manner that the two grids of tube 94 get equal signals when the web is in register. Tube 94 further amplifies these signals and feeds the grids of tube 104. Both grids of 104 are held in cut-off for unprinted portions of the web at the voltages of diode-anodes 115, 115', and are raised above these voltages for the duration of printing seen by the phototube, to unchanging amplitudes for grid 105', but to amplitudes dependent on the lateral position of the web for grid 105. These amplitudes will cause the cathodes 106, 106' to follow and to pull corresponding current through resistors 109, 109'. These currents charge capacitor 108, the current of anode 107' making it more negative and the current of cathode 106 making it more positive. In register these currents are equal and neutralize each other. If the sheet is out of register, a charge of corresponding polarity accumulates on capacitor 108. This charge will cause meter 11 to travel in the corresponding direction and when the charge will reach a certain value, it will cause tube 126 to send current through relay 128 and if it reaches a certain lower value, it will cause tube 126 to send current through relay 128'. Then contact 130 or 130' will initiate correction and contact 129 or 129' will reset the voltage across capacitor 108 so that after each correction, the system starts out reset, ready to act upon the new state of register. By adjusting the resistance of 109, 109', the amount of charge for a given signal can be adjusted, and by adjusting the capacitances 127, 127' the time can be set during which 128 or 128' will stay energized after capacitor 108 has been reset. It is seen that this circuit will indicate perfect register when track 13 is half covered by the edge of the printing, independently of whether this printing appears over a big or a small percentage of the total time or whether this printing is dark or light, as long as the printing in track 14 is similar to that in track 13.

This circuit is also equipped to detect side register on patterns in which part of the printing would ordinarily interfere with side register indication from other parts. Thus, if a "checkerboard pattern," as shown in Fig. 6 is inspected then, in perfect register, the printing 12' would cover as much of the inspected area during one part of the time as printing 12 covers during the other part, and out of register would increase the darkness seen in one part of the time but decrease it during the rest of the time. To allow detection of side register from such a track, as is often encountered in the printing of magazines, tube 95 is procured which suppresses any signal occurring on grid 101 during periods in which phototube 15' sees unprinted portions. This is achieved in the following way: grid 96 is kept at a conducting potential, of say, −1 volt by voltage divider 103, 104 so that current in cathode 100 prevents grid 101 from assuming a negative voltage. But when a negative signal appears across resistors 92', 93', then this signal is transmitted to grid 96 through capacitor 140, so that in these periods, and only in these periods is grid 101 able to assume a negative voltage up to amplitudes limited by the voltage on said grid 96 and transmit such signals as are applied to it in accordance with how much of printing 12 falls into track 13. During the passage of printing 12' grid 101 is inactive and so this printing will not interfere with indications from printing 12.

When two opposite edges of the printing are to be inspected as in connection with Figs. 3, 5 and also in the case of Fig. 7, this monitoring feature is not required and would interfere with proper functioning. In such applications tube 95 has to be discarded. Then each signal will come through independently from the other, one increasing and the the other decreasing by the same amount for small lateral displacements in one direction and vice versa.

There are numerous possible refinements of the circuit which can improve the performance of the present invention. For an example the same switch which alters resistances 109, 109' can be made to increase or decrease the value of capacitor 108 in certain positions. Diode systems can be connected in parallel with resistors 125, 125' to speed up actuation of relays 128, 128' without decreasing their on-time. A manual grounding switch can be connected to grid 101 to simulate white web during the passage of printed web. An automatic gain control can be applied to equalize not only zero but also speed of response for printings of different colors and of different areas.

Since the invention is utilized both on continuous webs and individually fed sheets of papers or other materials, the appended claims will refer to "pieces" undertsanding under this both webs and individual sheets. Inspection of a portion of the web is usually performed as has been described in connection with Figs. 9, 10. In the appended claims the term "in front of a track" is to be understood to mean that the photoelectric system inspects a determined area under which the web or the pieces move in the said manner. The result of the detection can be used to actuate correction, to indicate out of register by the speed of movement of the pointer of a meter (meter 10 of Figs. 1 and 11), to initiate an alarm if the out of register exceeds certain limits, or for other similar purposes. Whereas Fig. 11 shows relays, other means as e. g. thyratrons could also be used to perform similar actions. Fig. 10 shows a twin scanner. The expression "two scanners" used in the claims should be understood to include this amalgamation of two scanner systems into one body. Whereas Fig. 1 represents a printing stage of a multicolor printing press, the invention may also be used in connection with cutting, punching, creasing or other machines.

I claim:

1. In a device for the detection of the lateral deviation from normal disposition of a piece with respect to a machine through which said piece runs in a predetermined direction parallel with a lateral edge of said piece and having a pair of tracks laterally spaced apart and extending in said direction along said piece, the improvement comprising means continually illuminating and defining said tracks, one track having periodic light reflective characteristics occurring in cycle and producing an increase in light variation when said piece deviates from normal disposition on one side of said one track and a decrease in light variation when said piece deviates on the other side of said one track, the second track having periodic light reflective characteristics occurring in the same cycle as the first-mentioned characteristics and producing a substantially lesser increase and decrease of light variation when said piece deviates as aforesaid, first and second photoelectric means scanning the respective tracks, said first photoelectric means thereby producing a first alternating voltage signal related to the variation of light in the first track, said second photoelectric means thereby producing a second alternating voltage signal related to the variation of light in said second track, an electronic comparison circuit, means adjusting the amplitudes of said signals with predetermined relationship one to the other such that for normal disposition of said piece the adjusted amplitude signals are substantially the same notwithstanding the fact that said first and second alternating voltage signals are not the same at said normal disposition, means applying the adjusted amplitude signals to said comparison circuit, detecting means connected to the output of said comparison circuit and influenced in opposite direction by the respective adjusted amplitude signals whereby the signals neutralize one another for said normal disposition, but provide a directional detectable difference for lateral deviation from normal one side or the other.

2. A structure as claimed in claim 1 in which said comparison circuit includes a capacitor having a pair of amplifiers connected to charge the same and said adjusted amplitude signals are applied to the respective amplifiers to activate the same, the capacitor being charged positively or negatively in response to the output of the amplifiers when said deviation is one side or the other from normal but there being no charging output when the piece is in normal disposition, and the detecting means including at least a second pair of electronic amplifiers each including at least a grid, cathode and plate with the cathodes interconnected and together connected through an impedance to a point substantially negative with respect to the grids of the said amplifiers so that change of current in one of said amplifiers will cause an opposite change of current in the other of said amplifiers, and having the capacitor connected to control one of said second pair.

3. In a device for the detection of relatively small lateral deviations from normal disposition of a piece with respect to a machine through which said piece runs in a direction parallel with the lateral edge of the said piece and comprising illuminating means defining a pair of parallel tracks along the piece running in the said direction, first and second photoresponsive means scanning the respective tracks and producing thereby a first and second signals the respective characteristics of which are functions of the amount of light reflected from the said tracks, one track and hence the first signal having variations between periods of high and low reflectivity and such variations being substantially unchanged for relatively small lateral deviations of said piece from normal disposition, and said second track and the second signal having at least one period in which the reflectivity varies with relatively small lateral deviations, being higher than normal when the deviation is on one side and lower when the deviation is on the opposite side of normal, and the said one period occurring at a time affecting said second photoresponsive means while the period of low reflectivity of said first track is affecting the first photoresponsive means, the improvement comprising electronic comparison means, means adjusting the amplitudes of said first and second signals to be substatntially equal for the condition of normal disposition of said piece, means applying said adjusted signals to said comparison means, detecting means connected with the output of said comparison means for detecting any difference between said adjusted signals, and a suppression circuit connected to said comparison means and affecting the adjusted second signal to limit the value of same to the unadjusted first signal.

4. A structure as claimed in claim 3 in which comparison circuit includes a pair of amplifiers each having a control electrode and the first adjusted signal being applied to the first control electrode while the second adjusted signal is applied to the second electrode, and in which said suppression circuit includes a tube biased substantially to cut-off and having its cathode connected to the second control electrode also, said first signal being applied to said last mentioned tube to affect the bias thereof whereby the signals at the control electrodes of said amplifiers will be substantially equal during periods of high reflectivity, said suppression circuit being rendered inoperative by said first signal during periods of low reflectivity.

5. Apparatus for automatically controlling the lateral position of a piece moving through a machine in a predetermined direction parallel with a lateral edge of the said piece and the piece having periodically occurring markings thereon, illuminating means directed against the piece and reflected therefrom to a first photoresponsive device whereby as the piece moves a first narrow track is defined along said direction and a first signal is produced by said first photoresponsive device, said illuminating means also being directed against said piece at a position spaced laterally from said first narow track and reflected therefrom to a second photoresponsive device whereby as the piece moves a second narrow track is defined along said direction parallel with said first track and a second signal is produced by said second photoresponsive means, the markings along said tracks being such that the said both signals vary periodically and the lateral position of the first track being positioned relative said markings so that the periodic variation of said first signal increases from a normal amount when there is lateral deviation of said piece to one side of the first track and decreases from said normal amount when the deviation is toward the opposite side of said first track, the second track being positioned relative said markings so that the periodic variation of said second signal increases and decreases with deviation from normal as said first signal but in a substantially lesser amount, the improvement comprising an electronic comparison circuit having a pair of input amplifiers and the first and second signals being connected to the respective input amplifiers, a capacitor, electronic means connected with said input amplifiers and driven by said first and second signals and connected to charge said capacitor positively or negatively, said electronic means being effective to charge the capacitor with one polarity as a function of said first signal, and to charge the capacitor with opposite polarity as a function of the second signal, and an output amplifying system having a pair of input terminals and two pairs of output terminals, the input terminals being connected across said capacitor whereby to have the potential of said capacitor impressed thereacross, said output amplifying system including at least two electronic tubes biased such that a rising signal on one tube will cause an increase of current flow in said one tube and decrease of flow of current through the second tube, and a falling signal on said one tube will decrease the curent flow in said one tube while increasing the flow of current in the opposite tube, the said pair of input terminals comprising the input to said one tube, and said pairs of output terminals comprising the plate circuits of said two electronic tubes, and lateral correction means for said machine driven by the outputs of said two electronic tubes.

6. In a device for automatically controlling the lateral position of a web moving through a machine along a desired path and having a recurrent pattern thereon which has parts of a reflectivity contrasting with the reflectivity of the web itself, illuminating means directed against the web, first photoresponsive means arranged to receive reflected light from a first track parallel with the direction of movement of the web and straddling a lateral edge of one of said parts whereby to provide a first signal whose amplitude is a value related to the ratio of portions of contrasting reflectivity encompassed by said track only while passing one of said parts when the web is in desired position, but whose value increases or decreases with lateral deviation one side or the other from desired position, second photo-responsive means arranged to receive reflected light from a second parallel track but the second track passing wholly through one of said parts while said first track passes along the edge of a part and the second track belong the web itself while passing between parts irrespective of the position of the first track whereby to produce a second signal whose characteristic varies substantially as the photoresponsive device views the same, the amplitude of the second signal when said track is passing through said part being substantially different from the amplitude of said first signal during that period, and the second track being laterally positioned so that small deviations will have substantially no effect upon said first signal, comparison means having said signals applied thereto in opposition for providing an output related to deviation, and means detecting said deviation, said comparison means including an electronic amplifier tube having at least grid, plate and cathode and connected to the second photoresponsive means to have the said second signal applied to its grid, the first photoresponsive means being connected to said cathode to have said signal applied at said cathode, whereby to suppress signals at said cathode which exceed the said second signal.

7. Apparatus for detecting lateral deviation from centered position of a web moving through a machine and having a checkerboard pattern thereon which is made up of at least two adjacent longitudinal lines of spaced apart rectangles, each line being offset from the other so that alternate rectangles of each line meet the corners along common aligned edges, comprising means illuminating a first track along said aligned edges and the track being part on and part off of the edge of successive rectangles along said aligned edges and a first photocell receiving the reflection from the first track and producing a first signal, said means also illuminating a second track which is parallel with the first but laterally spaced therefrom and positioned to pass longitudinally through one of said lines of rectangles only and between the rectangles of said line, and a second photocell receiving the reflection from the second track and producing a second signal, the first signal being substantially constant when the web is centered and increasing or decreasing only in level when the web deviates one side or the other from centered position, but the second signal providing variations which include excursions substantially greater than the level of said first signal while the web is centered, but which do not vary substantially with deviations, signal comparison means, and the photocells being connected to said means to apply said signals thereto, means for detecting any difference between said signals, and means suppressing the said first signal as said second photocell is receiving reflections from said second track between rectangles, whereby the first signal will in effect have variations simultaneously with the variations of the second signal, and said suppressing means acting upon said first signal whereby said comparison means sees only said variations of said first signal and compares the same with the variations of said second signal.

References Cited in the file of this patent

UNITED STATES PATENTS

| | | |
|---|---|---|
| 2,203,706 | Stockbarger | June 11, 1940 |
| 2,220,737 | Jones | Nov. 5, 1940 |
| 2,566,399 | Bishop | Sept. 4, 1951 |
| 2,583,580 | Ludwig | Jan. 29, 1952 |